F. A. R., H. C. & O. L. FIEBACH.
LOADER FOR CORN HARVESTERS.
APPLICATION FILED MAR. 18, 1910.
985,992.
Patented Mar. 7, 1911.
2 SHEETS—SHEET 1.
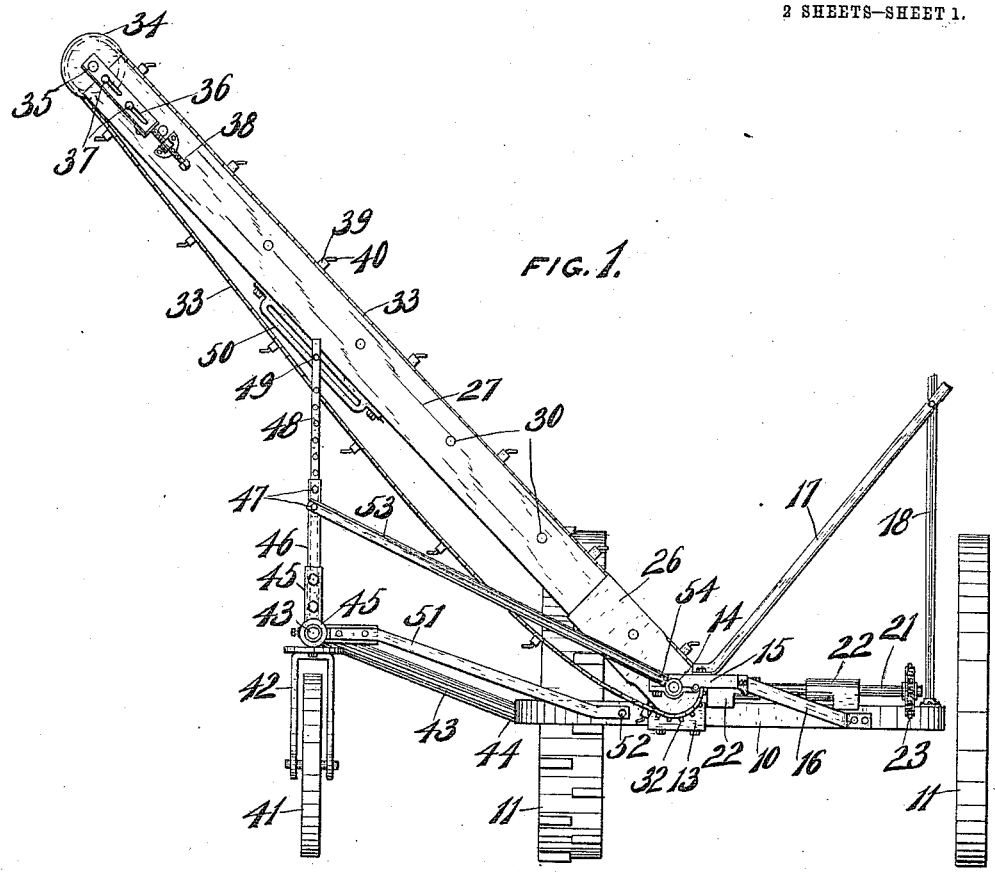
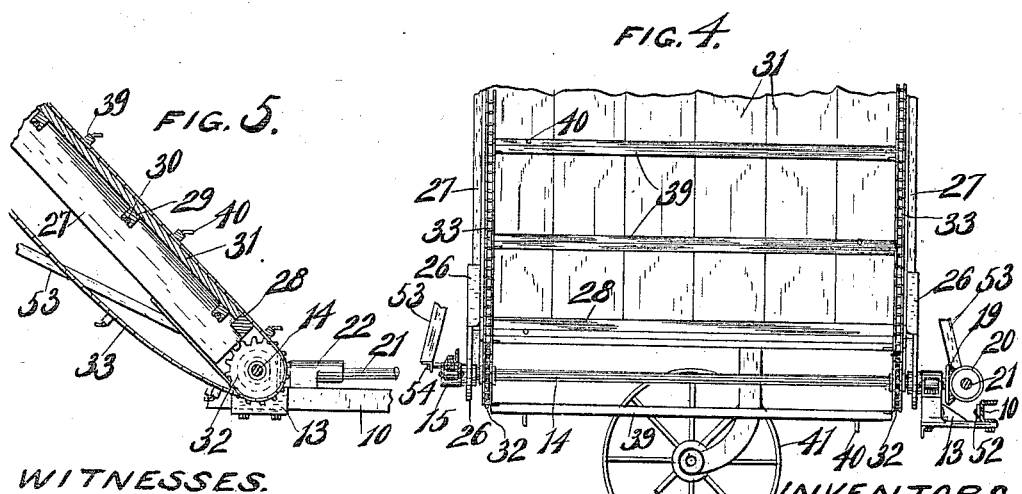

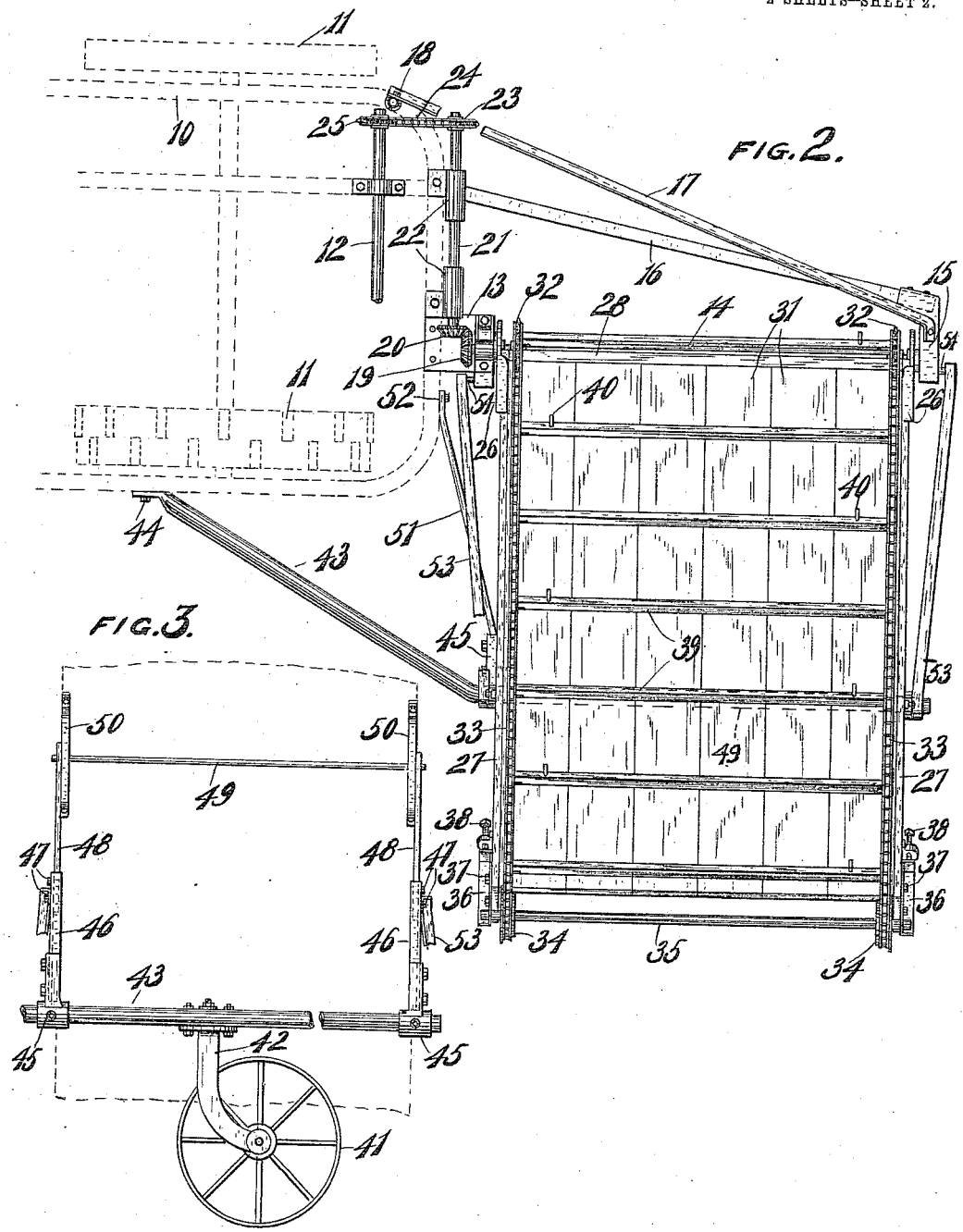

UNITED STATES PATENT OFFICE.

FRANK A. R. FIEBACH, HENRY C. FIEBACH, AND OTTO L. FIEBACH, OF LAKEMILLS, WISCONSIN.

LOADER FOR CORN-HARVESTERS.

985,992. Specification of Letters Patent. Patented Mar. 7, 1911.

Application filed March 18, 1910. Serial No. 550,188.

*To all whom it may concern:*

Be it known that we, FRANK A. R. FIEBACH, HENRY C. FIEBACH, and OTTO L. FIEBACH, residing in Lakemills, in the county of Jefferson and State of Wisconsin, have invented new and useful Improvements in Loaders for Corn-Harvesters, of which the following is a description, reference being had to the accompanying drawings, which are a part of this specification.

This invention has for its object to provide an elevating means as an attachment for a corn harvester for receiving the corn from the harvester and discharging it into a wagon which may travel alongside of the harvester, such elevator being of sufficient width to accommodate the bundles of corn in a horizontal position thereon.

An object of this invention is to simplify the construction and the arrangement of the driving mechanism which is geared with the mechanism of the corn harvester.

With the above and other objects in view the invention consists in the loader for corn harvesters herein claimed and all equivalents.

Referring to the accompanying drawings in which like characters of reference indicate the same parts in the different views: Figure 1 is a rear elevation of a loader for corn harvesters constructed in accordance with this invention and connected with the frame of a corn harvester; Fig. 2 is a plan view thereof; Fig. 3 is a side view of the caster wheel for supporting the elevator; Fig. 4 is a side view of the loader showing the lower end of the elevator and its connection with the corn harvester frame; and, Fig. 5 is a sectional elevation of the lower end of the elevator.

In these drawings 10 indicates the main frame of a corn harvester which is mounted on the wheels 11, as usual, and has a countershaft 12 journaled thereacross which is driven from one of said wheels in the ordinary manner.

A bracket 13 is mounted on the rear end of the main frame and forms a bearing for one end of a shaft 14 which extends rearwardly from the machine with its other end journaled in a bearing formed by an angular casting 15 which is connected by a brace rod 16 with the rear end of the frame 10 and by a tie rod 17 with the standard 18 at the corner of the main frame 10. This shaft 14 has a beveled gear 19 on its end meshing with a beveled gear 20 on the end of a supplemental shaft 21 which is journaled in bearings 22 on the rear end of the main frame 10, said shaft 21 receiving motion from the countershaft 12 by having a sprocket wheel 23 on its end connected by a chain 24 with a sprocket wheel 25 on the countershaft 12. The ends of the shaft 14 do not bear directly within the bearings 13 and 15, but fit within sleeves of pivot plates 26 which in turn fit within the said bearings. Said pivot plates 26 have inwardly turned top and bottom flanges to receive between them side boards 27 of an elevator frame, which further comprises a cross piece 28 connecting the lower ends of the side boards and a series of grooved cross strips 29 also connecting the side boards at intervals with tie rods 30 fitting in their grooves and binding the side boards 27 together while bracing the cross strips 29 to rigidly support a decking 31 of boards extending lengthwise of the frame and resting at their lower ends against the cross piece 28. The shaft 14 is provided with a sprocket wheel 32 in line with each of the side boards 27 and conveyer chains 33 travel around said sprocket wheels and above and below the side boards and around flanged wheels 34 at the upper end of the conveyer frame which are carried by a shaft 35 journaled in adjustable bearings 36. The adjustable bearings 36 preferably consist of angle iron strips which have slot connections with clamping bolts 37 at the upper ends of the side boards 27 so as to be slidable upon said side boards, and an adjusting screw 38 mounted on each of the side boards bears against the bent up end of said angle iron strip to accomplish the adjustment thereof for tightening the conveyer chains 33. The conveyer chains are connected at intervals by slats 39 which are provided with backwardly bent hooks or projections 40 to engage the bundles of corn delivered to the lower end of the elevator by the corn harvester and to lift them during the travel of the chains up the conveyer frame until, on passing around the flanged wheels 34, they drop the bundles of corn into a wagon or the like traveling alongside of the corn harvester.

The conveyer frame is supported in its elevated position by means of a caster wheel 41 mounted in a yoke 42 having a swivel connection with a draft bar 43, which is preferably in the form of a pipe, as shown, and which is pivotally connected to the side of the frame of the harvester at 44. The draft bar 43 extends obliquely from the side of the harvester frame for a distance at its front portion and then is bent to extend in the line of the draft at its rear portion. On the latter portion of the draft bar 43 are clamped a pair of collars 45 which form clamping connections for upright channel iron standards 46. These standards are adjustably connected by means of bolts 47 with adjusting rods 48, which have numerous openings for such adjustment, and which are connected by a rod 49 extending across the under side of the conveyer frame and sliding in slotted plates 50 secured thereto. The front collar 45 has, in addition to its upstanding connection for the standard 46, a horizontal projection which forms a connection for a stay bar 51 pivotally mounted at 52 to the rear of the harvester frame. The standards 46 are held in their upright position by means of tie rods 53 which connect with one of their clamping bolts 47 and pivotally connect with lugs 54 on the bearings 13 and 15 respectively. The pivotal connections for the draft bar 43 and the stay bar 51 are sufficiently loose to prevent binding, notwithstanding the different angular positions thereof, and by reason of these pivotal connections the caster wheel 41 may remain in bearing with the surface of the ground in passing over irregularities, the tie rods 53 meanwhile preserving the upright position of the standards 46 and the conveyer frame slightly swinging on its pivotal connections while the rod 49 slides through the slotted plates 50. The angular position of the conveyer frame may be adjusted to deliver the corn at the desired elevation by changing the position of the adjusting rods 48 in the uprights 46, the rod 49 then taking a new position in the slotted plates 50 incident to such adjustment.

By means of this invention the conveyer may be made sufficiently wide to receive the bundles of grain crosswise thereof and elevate and discharge the same without difficulty into a wagon or the like traveling alongside of the harvester and the parts are so simple in their construction as to be strong and durable and to avoid the necessity for repairs.

What we claim as new and desire to secure by Letters Patent is—

A loader for corn harvesters, comprising the combination with the harvester frame and its driving mechanism, of a draft bar pivotally connected with the side of the harvester frame and extending obliquely from the harvester frame at its front portion and then bent to extend in the line of draft at its rear portion, a caster wheel swiveled to the rear portion of the draft bar, collars secured to the draft bar at its rear portion ahead of and to the rear of the caster wheel, a channel iron upright secured to each of the collars, an adjusting rod adjustably mounted in each of the channel iron uprights, a rod connecting the adjusting rods, a conveyer frame pivotally mounted on the harvester frame, slotted plates on the conveyer frame through which said rod passes, tie rods connecting the uprights to the pivotal mountings of the conveyer frame, and a brace rod connected with the front collar of the draft rod and pivotally connected with the rear of the harvester frame.

In testimony whereof, we affix our signatures, in presence of two witnesses.

FRANK A. R. FIEBACH.
HENRY C. FIEBACH.
OTTO L. FIEBACH.

Witnesses:
E. C. BROWN,
O. B. COOMBE.

---

Copies of this patent may be obtained for five cents each, by addressing the "Commissioner of Patents, Washington, D. C."